United States Patent [19]

Koizumi et al.

[11] 4,165,458
[45] Aug. 21, 1979

[54] SIGNAL DECISION SYSTEM

[75] Inventors: Takayuki Koizumi; Teruo Usami, both of Amagasaki, Japan

[73] Assignee: Mitsubishi Denki Kabushiki Kaisha, Tokyo, Japan

[21] Appl. No.: 787,454

[22] Filed: Apr. 14, 1977

[30] Foreign Application Priority Data

Apr. 23, 1976 [JP] Japan ................................. 51-46845

[51] Int. Cl.$^2$ ............................................. G06M 3/02
[52] U.S. Cl. ........................... 235/92 PE; 235/92 TF; 235/92 PK; 235/92 R
[58] Field of Search ......... 235/92 PE, 92 PK, 92 PB, 235/92 CA, 92 TF, 92 QC; 340/558, 559, 560

[56] References Cited

U.S. PATENT DOCUMENTS

| | | | |
|---|---|---|---|
| 3,439,358 | 4/1969 | Salmons | 235/92 PK |
| 3,558,004 | 1/1971 | Boyd et al. | 235/92 PK |
| 3,793,512 | 2/1974 | Lorenzen | 235/92 QC |
| 3,881,353 | 5/1975 | Fathauer | 235/92 PK |
| 4,000,398 | 12/1976 | Conner | 235/92 PK |

*Primary Examiner*—Joseph M. Thesz
*Attorney, Agent, or Firm*—Wenderoth, Lind & Ponack

[57] ABSTRACT

An electrical signal originating from an abnormal sound is passed through a bandpass filter and compared with a reference signal by a comparator. When the electrical signal is not less than the reference signal, the comparator produces a pulse. A counter counts the pulses from the comparator and causes a display device to display the presence of the abnormal sound when its count exceeds a predetermined value within a predetermined time interval.

14 Claims, 3 Drawing Figures

SIGNAL DECISION SYSTEM

BACKGROUND OF THE INVENTION

This invention relates to a signal decision system and more particularly to a decision system for deciding either abnormal sounds or abnormal electrical signals indicating an abnormal status of an object to be measured.

Conventional systems for deciding, for example, unusual sounds have comprised a microphone for collecting and picking up the sounds from an associated object to be measured in response to the sound pressure of the sounds omitted therefrom, an amplifier for amplifying the resulting electrical signals, a bandpass filter or a plurality of bandpass filters each having both a center frequency and a frequency band characterized as the particular abnormal sound with respect to the resulting sound waveform, and decision means for determining the presence or absence of an abnormal sound in response to an output level from the bandpass filter or filters. However such conventional systems have frequently caused malfunctions owing to external abrupt disturbances and/or transient increase in the level of the sound pressure which should not be decided to be abnormal and causes problems in using them with production lines.

Accordingly it is an object of the present invention to provide a new and improved signal decision system including means for counting the number of occurrences of an abnormal signal on an object to be measured and responsive to the counted number of the occurrences of the abnormal signal in excess of a predetermined value to determine the occurrence of an abnormal state of the object to be measured.

SUMMARY OF THE INVENTION

The present invention provides a signal decision system comprising in combination, an object to be measured, detector means for detecting an abnormal signal from the object, filter means connected to the detector means to filter an output signal from the detector means, comparison means connected to the filter means to compare the output signal from the latter with a reference signal to produce a pulsed signal when the output signal from the filter means has a level not less than a predetermined level, and decision generation means connected to the comparison mean to count the pulsed signals successively produced from the comparison means and to produce a decision signal when the counted number of pulsed signals equals at least a predetermined value within a predetermined time interval.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

While the present invention is equally applicable to reception of abnormal electrical signals or sounds originating from objects to be measured the same will now be described in terms of abnormal sound.

Figure 1:
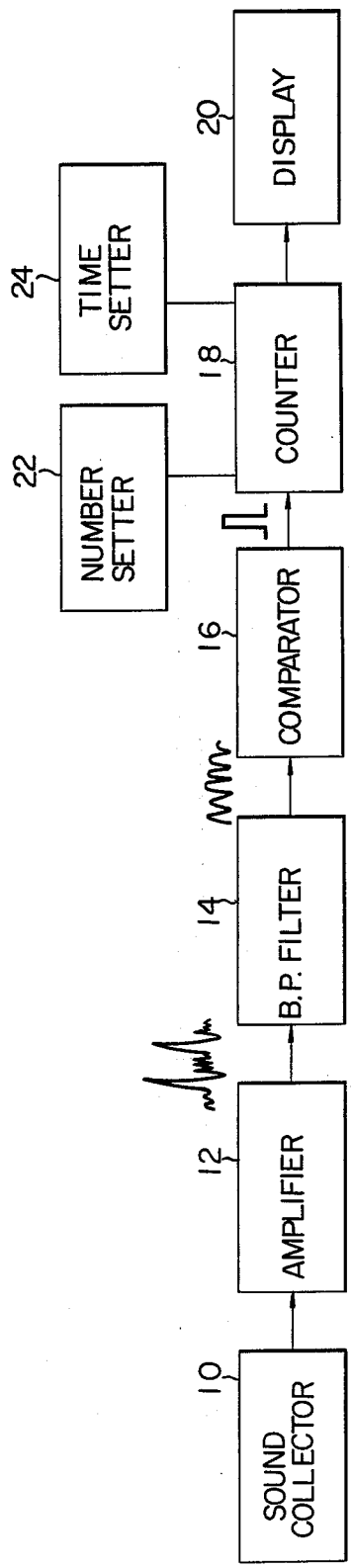
FIG. 1 is a block diagram of one embodiment according to the signal decision system of the present invention.

Referring now to FIG. 1 of the drawings, there is illustrated a signal decision system constructed in accordance with the principles of the present invention. The arrangement illustrated comprises a sound collector 10 including a microphone (not shown), and an amplifier 12 connected thereto to form means for detecting a signal from an object to be measured (not shown) with the sound collector 10. The amplifier 12 is connected to filter means 14 having a variable center frequency, for example, a variable bandpass filter.

The arrangement further comprises a comparator 16 connected to the filter means 14 including a level setter for setting the level of a reference signal (not shown), an accumulating device, for example, a counter 18 connected to the comparator 16 and a display device 20 connected to the counter 18. The counter 18 cooperates with both a number setter 22 for setting the number of counts and a decision time setter 24 for setting a decision time interval to form a means for producing a decision signal with the counter 18.

The operation of the arrangement shown in FIG. 1 will now be described. Signals generated by an object to be measured (not shown), in this case an abnormal sound is collected by the sound collector 10 where the abnormal sound is collected and converted to a corresponding electrical signal. Then the electrical signal is supplied to and amplified by the amplifier 12. The amplified signal from the amplifier 12 (see the waveform illustrated on the output side of amplifier 12 in FIG. 1) is applied to the variable bandpass filter 14 having a center frequency and bandwidth settable in accordance with the abnormal sound. That portion of the signal lying in a preset frequency band is permitted to pass through the filter 14. The signal portion passed through the filter 14 (see the waveform illustrated on the output side of filter 14) is supplied to the comparator 16 to be compared with an externally set reference signal. The comparator 16 produces a pulsed signal when the supplied signal portion has a level equal to or higher than that of the reference signal (see the waveform denoted at the output of comparator 16). The pulsed signals thus produced are successively applied to the counter 18 and accumulated therein.

When the counted number of pulsed signals becomes equal to or higher than a predetermined value set by the number setter 22 within a predetermined time interval or decision time set by the time setter 24, the counter 18 produces a signal indicating a decision signal or the presence of an abnormal sound. This signal indicating the presence of the abnormal sound is supplied to and displayed on the display device 20. Thus the operator can readily ascertain the occurrence of an abnormal sound on the object to be measured by observing the display device 20.

Figure 2:
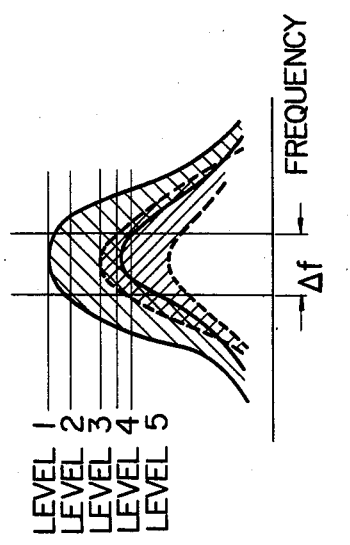
FIG. 2 is a graph useful in explaining the principles of the present invention.

Both the number of counts set by the number setter 22 and the decision time set by the time setter 24 will now be described in more detail in conjunction with FIG. 2 wherein the levels of signals passed through the bandpass filter 14 are plotted in ordinate against the frequency in abscissa. Typically, a normal signal has a level distribution defined by the upper and lower dotted curve shown in FIG. 2 and an abnormal signal has a level distribution defined by the upper and lower solid lines shown in FIG. 2 with the two level distributions overlapping each other.

It has been found that both the decision time and the number of counts depend upon the difference in level between the normal and the abnormal signals passed through the bandpass filter 14 and also upon the status under which the abnormal signal is caused. More specifically, if the level of the reference signal is set to be equal to the maximum level of the distribution curve for the abnormal maximum signal as shown by LEVEL 1 in FIG. 2, then a decision is rarely effected within the decision time. Alternatively, it will consume a very long time. If the reference level is set to lie between the maximum levels of distribution curves for the abnormal and normal maximum signals as shown by LEVEL 2 in FIG. 2, then the time interval required for the decision becomes fairly long. However, when the reference level is set to be equal to the maximum level of the distribution curve for the normal maximum signal as shown by LEVEL 3 in FIG. 2, then the decision can be accomplished within a relatively short time interval and without any malfunction.

If the reference level is further lowered to lie between the distribution curve for the normal maximum signal and that for abnormal minimum signal as shown by LEVEL 4 in FIG. 2, then the decision time can be decreased attended with an increased risk that a erroneous decision will be made. Where the reference level is set to be less than the maximum level of the distribution curve for the normal minimum signal as shown by LEVEL 5 in FIG. 2, it is quite impossible to accomplish the decision.

Thus it is optimal to set the level of the reference signal to be equal to LEVEL 3 or the maximum level of the distribution curve for the normal maximum signal as far as the decision time is concerned.

Regarding the number of counts, on the other hand, a single figure counter may be used to decide abnormal signals generated once per each second. This decision, however, consumes several seconds. The substitution of a two figure counter for a single figure counter strengthens the immunity against false alarms due to external noise. It has been found that a two figure counter is preferably used while the number of counts ranges from about 20 to 50 with satisfactory results.

Figure 3:
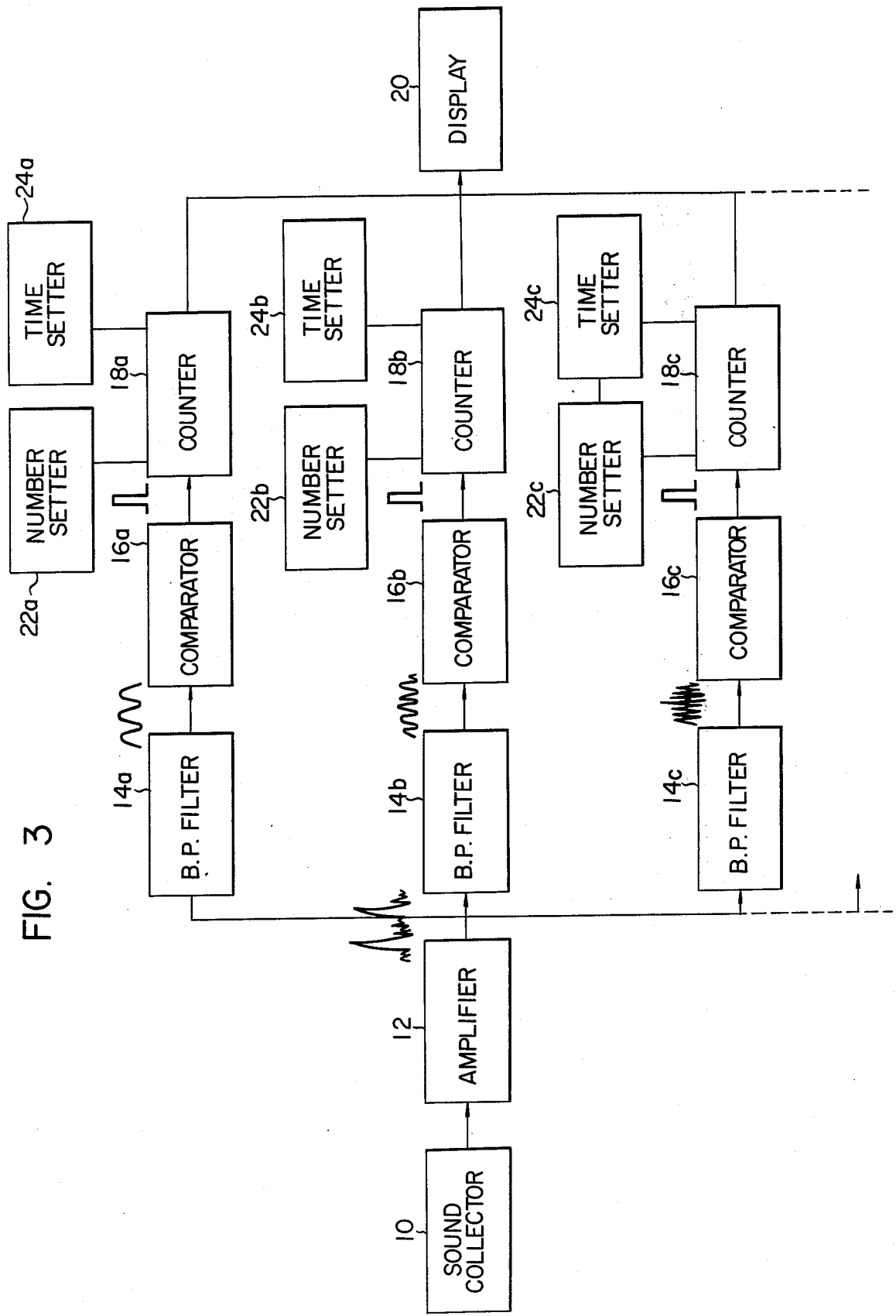
FIG. 3 is a block diagram of a modification of the present invention.

FIG. 3 shows a modification of the present invention including means for increasing the accuracy of determining abnormal signals. The arrangement illustrated is different from that shown in FIG. 1 only in that in FIG. 3 a plurality, in this case three, of series combinations of a bandpass filter 14a, 14b or 14c, a comparator 16a, 16b or 16c and a counter 18a, 18b or 18c are connected between the amplifier 12 and the display device 20 while the bandpass filters 14a, 14b and 14c differ in center frequency from one another. Each of the counters 18a, 18b and 18c is provided with its own number setter 22a, 22b or 22c and its own time setter 24a, 24b or 24c as in the arrangement of FIG. 1. Thus it will be ready understood that the arrangement of FIG. 3 is substantially identical in operation to that shown in FIG. 1.

In order to further increase the accuracy of decision, the plurality of counters 18a, 18b and 18c may be connected to logic circuitry such as a combination of "AND", "OR" and/or "NOR" circuits to perform a logic operation upon the decision signals delivered from the respective counters 18a, 18b and 18c.

While the present invention has been illustrated and described in conjunction with a few preferred embodiments thereof wherein an abnormal signal is detected as a signal to be determined, it is to be understood that it is not restricted thereto or thereby, and that it is equally applicable to the detection of any desired signal that is not abnormal. Also the input signal to the system is not restricted to an abnormal sound but it may be an unusual electrical signal. For example, the output signal from crack detection systems may be utilized as the input signal to the present system. In the latter case where an electrical signal is directly used as the input signal, the sound collector included in the detector means is omitted.

In addition, the decision time may be very long for particular applications. For example, where it is intended to sense an abnormal state developed on the bearing of very large-sized rotary machines such as electric motors, the bearing is maintained in the normal operation for a very long time interval such as several years and any abnormal state that might occur is started at a frequency of one for each hour or each day. Under these circumstances, it is possible to use the decision time having an infinitely large magnitude. Further, although the present invention comprises the counting of pulsed signals, the decision is substantially instantaneously accomplished. Thus the duration of the time interval required for the decision causes no problem for practical purposes.

From the foregoing it is seen that the present invention provides a signal decision system comprising means for detecting up signals having magnitudes not less than a predetermined magnitude from detected signals to produce and count pulsed signals, and means for generating a decision signal in response to a counted number of the pulsed signals in excess of a predetermined value. As a result, any signal can be detected with an increased signal-to-noise ratio and also, the system can be prevented from producing false alarms due to any abrupt external disturbance. Accordingly, the present invention can provide a signal decision system having a high accuracy and usable for general purposes.

While the present invention has been illustrated and described in conjunction with a few preferred embodiments thereof it is to be understood that numerous change and modifications may be resorted to without departing from the spirit and scope of the present invention.

What we claim is:

1. A signal decision system comprising, in combination, a detector means for detecting a signal from an object to be measured, a filter means connected to said detector means for filtering the output signal from said detector means, a comparison means connected to said filter means for comparing the output signal from said filter means with a reference signal for producing a pulsed signal when said output signal from said filter means has a level not less than a predetermined level, and a decision generation means connected to said comparison means for counting said pulsed signals successively produced from said comparison means for producing a decision signal when the counted number of said pulsed signals equals at least a predetermined value within a predetermined time interval.

2. A decision system as claimed in claim 1 wherein said decision signal is a signal indicating an abnormality.

3. A signal decision system as claimed in claim 1 wherein said signal from said object to be measured is an abnormal sound.

4. A signal decision system as claimed in claim 3 wherein said detector means includes means for converting said abnormal sound to an electrical signal.

5. A signal decision system as claimed in claim 4 wherein said means for converting said abnormal sound to said electrical signal comprises a sound collector.

6. A signal decision system as claimed in claim 3 wherein said means for converting said abnormal sound to said electrical signal comprises a sound collector.

7. A signal decision system as claimed in claim 1 wherein said signal from said object to be measured is an abnormal electrical signal.

8. A signal decision system as claimed in claim 1 wherein said filter means is a bandpass filter.

9. A signal decision system as claimed in claim 1 wherein said decision generation means comprises a counter, a time setter for setting said predetermined time interval, and a number setter for setting said predetermined value.

10. A signal decision system as claimed in claim 1 wherein said predetermined time interval is infinitely large.

11. A signal decision system as claimed in claim 1 wherein said decision generation means comprises a time setter for setting said predetermined time interval.

12. A signal decision system as claimed in claim 1 wherein said decision generation means comprises a number setter for setting said predetermined value.

13. A signal decision system comprising, in combination, a detector means for detecting a signal from an object to be measured, a plurality of filter means connected to said detector means, each of said plurality of filter means for filtering the output signal from said detector means, a plurality of comparison means each connected to a corresponding one of said plurality of filter means for comparing the output signal from said corresponding filter means with a reference signal to produce a pulsed signal when said output signal from said corresponding filter means has a level not less than a predetermined level, a plurality of decision generation means each connected to a corresponding one of said comparison means for counting said pulsed signals successively produced by said corresponding comparison means and for producing a decision signal when the counted number of said pulsed signals equals at least a predetermined value, and a single display means connected to all of said plurality of decision generation means to display the presence of said decision signal.

14. A signal decision system as claimed in claim 13 wherein said system further comprises a logic circuit connected between all of said plurality of decision generation means and said display means for performing a logic conjunction of said decision signals from said decision generation means.

* * * * *